United States Patent
Smith et al.

[11] 3,802,334
[45] Apr. 9, 1974

[54] POSITIVE DETENT DEVICE FOR THE NEEDLE YOKE OF A HAY BALER

[75] Inventors: Kenneth E. Smith, Lancaster; Charles A. Smith, New Holland, both of Pa.

[73] Assignee: Sperry Rand Corporation, New Holland, Pa.

[22] Filed: Mar. 29, 1972

[21] Appl. No.: 239,174

[52] U.S. Cl. .............................................. 100/19 A
[51] Int. Cl. ........................................... B65b 13/08
[58] Field of Search ............ 100/19 R, 19 A, 20, 21, 100/22, 23, 24

[56] References Cited
UNITED STATES PATENTS

| | | | |
|---|---|---|---|
| 2,766,684 | 10/1956 | Newcastle et al. | 100/19 A |
| 2,781,719 | 2/1957 | Hedtke | 100/19 A |
| 2,981,173 | 4/1961 | Nolt | 100/19 R |
| 3,122,991 | 3/1964 | Grillot | 100/19 A |
| 2,897,749 | 8/1959 | Vutz et al. | 100/19 A |

FOREIGN PATENTS OR APPLICATIONS

| | | | |
|---|---|---|---|
| 243,090 | 10/1965 | Austria | 100/19 R |

*Primary Examiner*—Billy J. Wilhite
*Attorney, Agent, or Firm*—Frank A. Seemar; John R. Flanagan; Joseph A. Brown

[57] ABSTRACT

A positive detent device for the needle yoke of a hay baler, the baler being of the type having a longitudinal bale case and a knotter mechanism disposed adjacent thereto and cooperable with a plurality of needles carried by said yoke to tie selected portions of hay contained in said bale case into bales. Said needle yoke and associated needles are normally disposed in a first position beneath the bale case with the needles stationed outside of the bale case. A drive, responsive to the actuation of the knotter mechanism, is employed to actuate the needle yoke from said first position to a second position in which the needles project through the bale case and cooperate with said knotter mechanism in tieing the hay into bales. The same drive is further operative to return said needle yoke and needles to said first position.

The positive detent device of the present invention comprises a notched generally semi-circular cam plate fixed to said needle yoke and a roller rotatively mounted on a spring bias lever arm, the roller being adapted to engage and move along said cam plate as said needle yoke is moved between said first and second positions. Said cam plate and lever arm are particularly disposed relative to each other such that said roller registers with the notch formed within said cam plate once the needle yoke assumes said first position, thereby tending to stop the needle yoke and preventing it from overrunning said first position.

5 Claims, 4 Drawing Figures

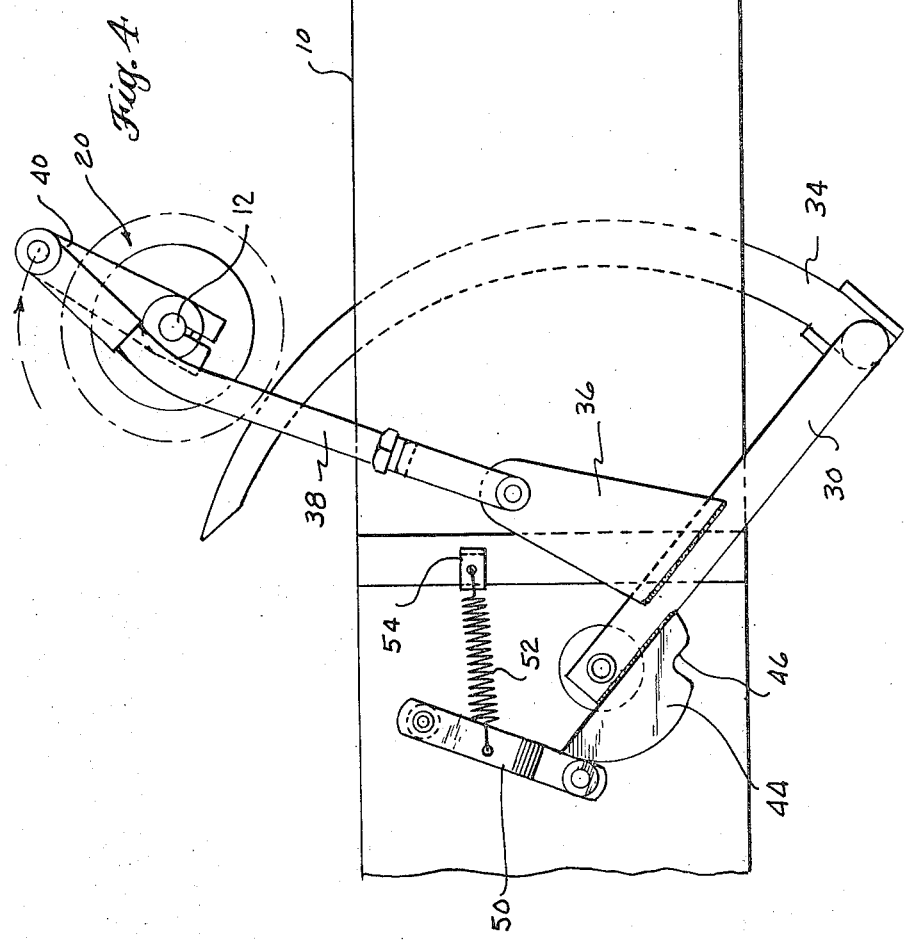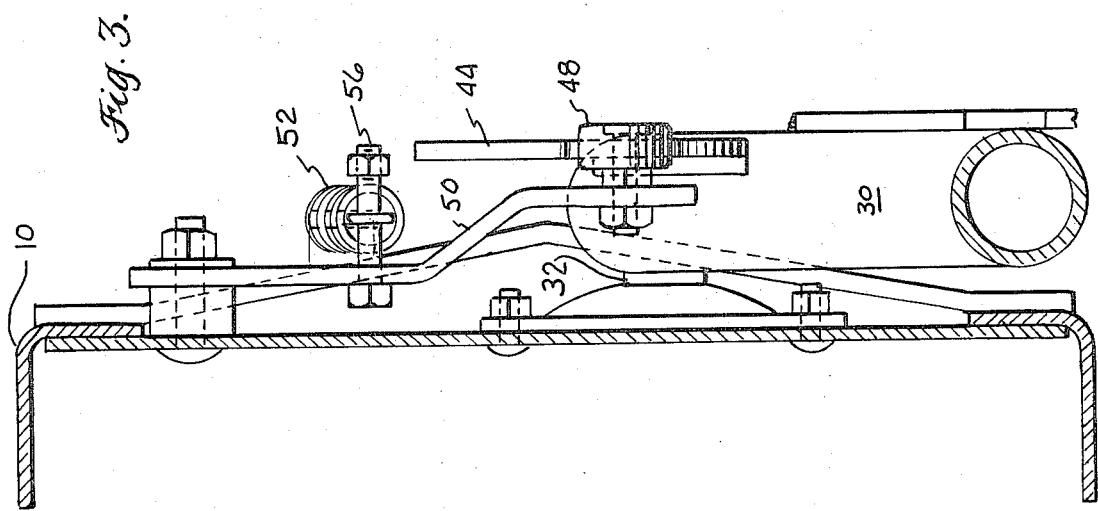

POSITIVE DETENT DEVICE FOR THE NEEDLE YOKE OF A HAY BALER

BACKGROUND OF THE INVENTION

The present invention relates to agricultural machinery, and more particularly to a hay baler having a positive detent device associated with the needle yoke thereof.

Past experience with hay balers indicates that it is quite difficult to constantly maintain the needle yoke of the baler in a first or home position (the first or home position being that position assumed by the needle yoke when the needles lie exteriorly of the bale case) when operating the baler in the field. In such field operations it is not uncommon for the needle yoke to inadvertently move from the home position such that a portion of the needles carried thereby project through the bale case and into the path of a timed plunger, resulting in shear bolt breakage or the breakage of the needles from the impact with the plunger.

Many balers provide a constantly engaged mechanical disc brake for the needle yoke drive which normally tends to hold the yoke in the home position and prevent inadvertent movement therefrom. However, after hours of wear, such mechanical disc brakes often become relatively ineffectual and sufficient braking force is not present to hold the yoke in the home position. Moreover, despite the presence of a normally reliable and workable disc brake, the needle yoke may be jarred from its home position as the baler traverses and encounters rough field terrain. It will be further appreciated that the movement of the yoke is somewhat induced by the massiveness of the yoke itself, particularly since the yoke is spaced from the drive source and the mechanical brake, thereby giving rise to a "lever arm" affect.

SUMMARY OF THE INVENTION

Applicants have devised a detent device for the needle yoke of a baler which is adapted to positively hold the needle yoke in the home position during the operation of the baler and prevents the needle yoke from overrunning the home position and prematurely moving therefrom, thereby avoiding the shear bolt and needle brakage stemming from such movement of the needle yoke in balers of the prior art. Specifically, the detent device of the present invention comprises a cam plate fixed to the needle yoke, the cam plate having a notch formed therein. A spring biased lever arm is pivotally mounted to the bale case adjacent the cam plate and includes a roller rotatively mounted thereon and particularly spaced to engage said cam plate as the needle yoke moves to and from the home position. Said lever arm and cam plate are particularly disposed such that the roller registers with said notch formed within said cam plate when said needle yoke assumes the home position, thereby tending to arrest the needle yoke as it returns to the home position and prevents it from overrunning, and further tending to hold the needle yoke in the home position until said yoke is positively driven therefrom.

It is therefore, the principle object of the present invention to provide a positive detent device for a needle yoke of a hay baler that prevents the needle yoke from overrunning the home position and further acts to maintain the needle yoke in said home position until positively driven therefrom.

A further object of the present invention is to provide a needle yoke detent device that positively holds the needle yoke in the home position, but is operative to release said needle yoke such that it may be freely moved from the home position when positively driven.

Another object of the present invention is to provide a needle yoke detent device that acts directly on the needle yoke, thereby acting at the principle point of mass and consequently facilitating control of the needle yoke.

More particularly, it is the object of the present invention to provide a needle yoke detent device comprising a cam plate, having a notch formed therein fixed to the needle yoke; and a cam following mechanism disposed adjacent said cam plate and engaged therewith, said cam plate and cam following mechanism being particularly disposed relative to each other such that said cam following mechanism registers with said notch formed within said cam plate when said needle yoke assumes the home position, thereby tending to arrest and hold said needle yoke in said home position.

Other objects and advantages of the present invention will become apparent and obvious from a study of the following description and the accompanying drawings which are merely illustrative of the present invention.

BRIEF DESCRIPTION OF THE DRAWINGS

FIG. 3 is an enlarged fragmentary cross sectional view taken as indicated by the arrows 3—3 in FIG. 1.

FIG. 4 is a side elevational view showing the relation of the parts with the needle in its uppermost or second position.

DESCRIPTION OF THE PREFERRED EMBODIMENT

Figure 1:
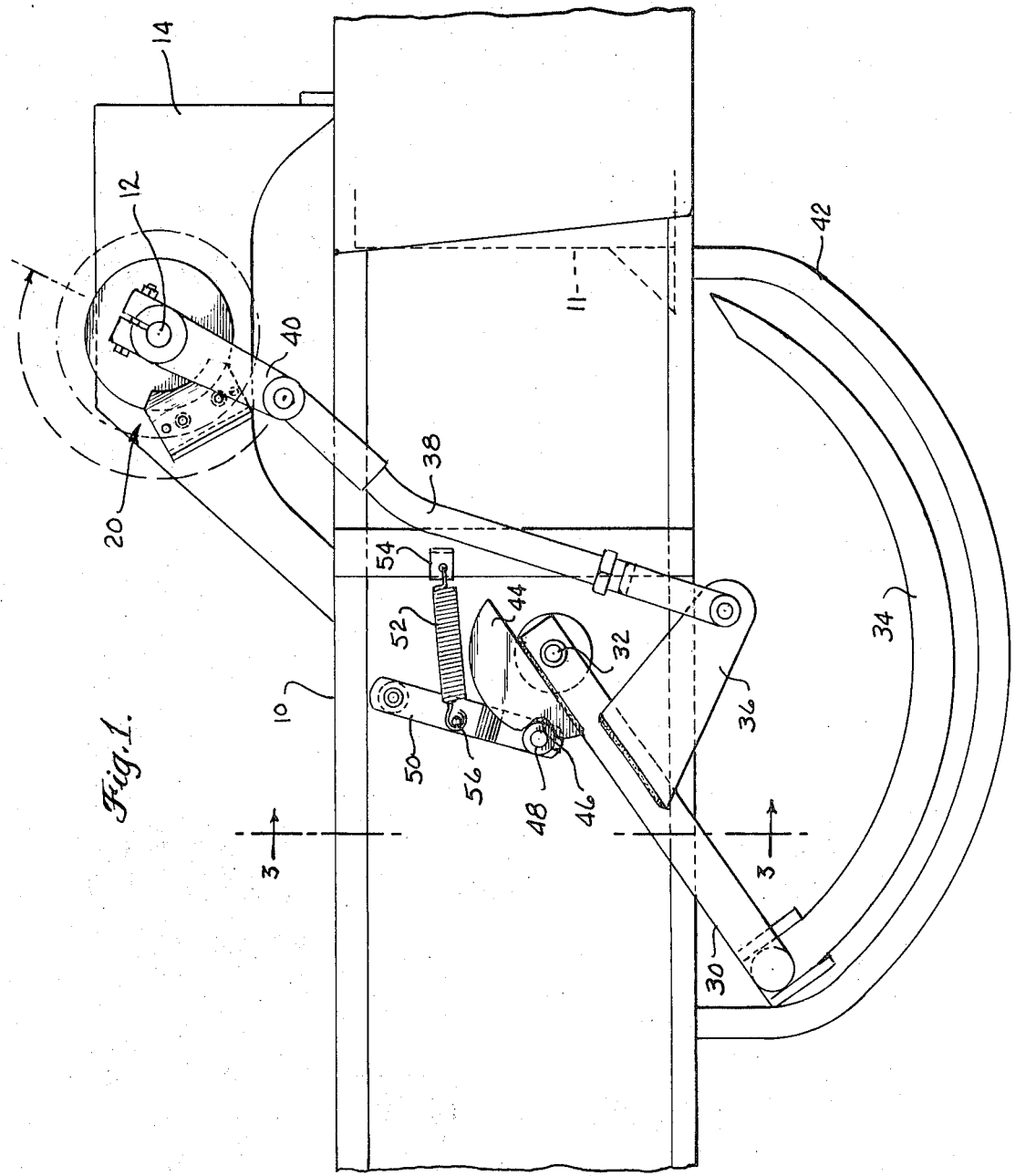
FIG. 1 is a side elevational view of a needle yoke control device constructed in accordance with the invention.
Figure 2:
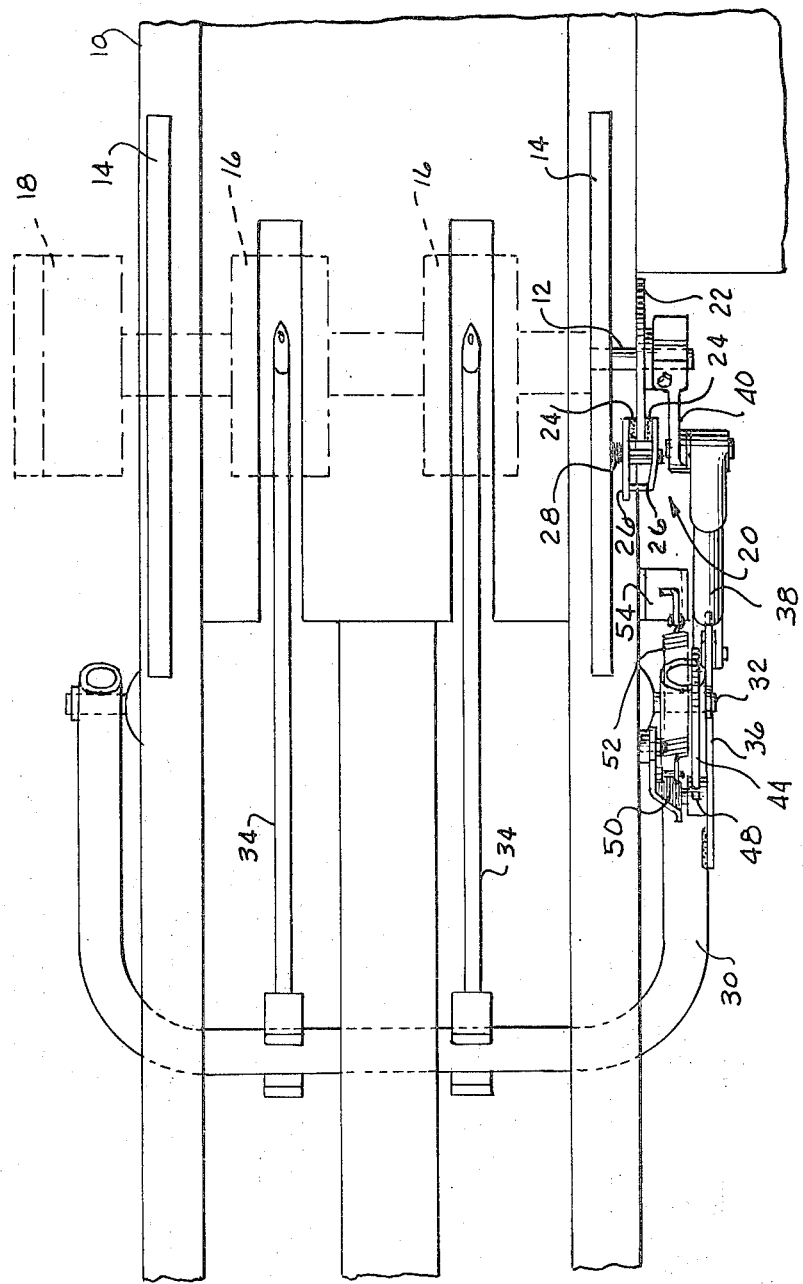
FIG. 2 is a plan view of FIG. 1 with the knotter mechanism of the baler indicated in phantom.

With reference to the drawings, particularly FIGS. 1 and 2, a generally fore-and-aft extending bale case 10 is shown therein, the bale case 10 being of a rectangular cross section and adapted to receive crop material therein for compression into bales of hay. To compress the hay, the bale case 10 is provided with a reciprocably mounted plunger 11, shown in dotted lines in FIG. 1. Although the details of the plunger construction and drive therefore is not shown in detail, it will be understood by those skilled in the art that the plunger is driven in time relationship to a feeding mechanism, not shown, that sweeps crop material into the bale case 10 in front of the plunger such that the plunger continually compresses the crop material fed thereto.

Continuing to refer to FIGS. 1 and 2, it will be seen that a knotter drive shaft 12 is rotatively mounted transversely above the bale case 10 within a pair of laterally spaced mounting brackets 14, the drive shaft 12 being operative to drive a pair of axially spaced knotter assemblies 16 (shown in phantom) associated with the drive shaft 12. The knotter drive shaft 12 and knotter assemblies 16 are driven intermittently in timed relationship to the movement of crop material through the bale case 10 by a single revolution clutch 18 (also shown in phantom) which is operatively driven by a side chain drive, not shown. Disposed on the end of shaft 12 opposite the single revolution clutch 18 is a caliber type mechanical disc brake that is constantly engaged to provide a braking force to the drive shaft 12, the disc brake being particularly shown in FIG. 2 and indicated generally by the numeral 20. Viewing the disc brake 20 in detail, a disc 22 is fixed to drive shaft 12 for rotation therewith and a pair of laterally spaced brake packs 24 are fixed to the inner sides of laterally spaced arms 26, the arms 26 being spring biased towards each other by a spring 28 such that the brake pads 24 are held in frictional engagement with the disc 22.

Pivotally mounted to opposite sides of the bale case 10 by pivot pins 32 is a needle yoke 30 which is swingable about the transverse axis of the pivot pins from a home or first position, as shown in FIG. 1, to a second position, as shown in FIG. 4. Fixed to the lower portion of the needle yoke 30 is a pair of laterally spaced curved needles 34, the needles being particularly adapted to move with the yoke such that they are operative to project through the bale case 10, as shown in FIG. 4, for cooperation with a respective knotter assembly 16.

As is the case in most conventional balers, the needle yoke is driven in time relationship to the knotter assemblies 16, such that the needles 34 may cooperate with respective knotter assemblies 16 to form selected portions of compressed hay held within the bale case 10 into bales. More particularly, the needle yoke 30 of the present invention is cycled between the home and second position by a single revolution of the drive shaft 12. To drive the yoke 30, an actuating ear 36 is welded, or secured by other suitable means, to the yoke 30. Pivotally connected to the actuating ear 36 is a connecting rod 38 which is in turn pivotally connected to a crank arm 40 secured to the shaft 12 and rotatable therewith. Thus, it is seen that a single revolution of the drive shaft 12 results in the crank arm 40 turning a corresponding revolution, which causes the needle yoke 30 to move from the home position, as shown in FIG. 1, to the second position, as shown in FIG. 4, and back to the home position. As particularly shown in FIG. 1, the bale case 10 includes a curved guard structure 42 surrounding the needle yoke 30 and the needles 34 carried thereby, the guard structure tending to protect the needles from large mounds of dirt and other obstructions that may be traversed by the baler.

Turning to the positive detent device of the present invention, it can be seen from the drawings that a generally semi-circular cam plate 44 is fixed to one arm of the yoke in general proximity to the transverse pivot axis of the yoke 30. Also, it is particularly observed in FIGS. 1 and 4 that the cam plate 44 includes a notch 46 formed about the periphery thereof. Pivotally mounted to the bale case 10 closely adjacent the cam plate 44 is a lever arm 50. The lever arm 50 is spring biased towards the cam plate 44 by a coil spring 52 which has one end secured within a tab 54 fixed to the bale case 10 and the other end hooked around a bolt 56 extending outwardly from the lever arm 50. Rotatively mounted to the lower end of the lever arm 50 is a roller 48 which is aligned with the cam plate 44 so as to engage the curved periphery thereof and move therealong as the yoke is moved between the home position, shown in FIG. 1, and the second position, shown in FIG. 4. It is observed that the cam plate 44 and lever arm 50 are particularly disposed such that the roller 48 coinsides with the notch 46 formed within the cam plate 44 when the yoke 30 assumes the home position.

Therefore in operation it is seen that once the needle yoke returns to the home position (FIG. 1) from the second position, the roller 48 registers with the notch 46, thereby arresting the needle yoke 30 and preventing it from overrunning the home position. Moreover, once the yoke 30 has reached the home position and the next bale is being formed, the presence of the roller within the notch 46 tends to prohibit the yoke from being jarred from the home position as the baler encounters and traverses rough ground terrain, thereby avoiding the situation of having the needles 34 projecting up through the bale case 10 into the path of the plunger 11.

Once the single revolution clutch 18 is actuated to form a tie, the shaft 12 is rotated causing the crank arm 40 through the connecting rod 38 to pivot the yoke 30 towards the front of the baler and into the second position, as shown in FIG. 4. As the yoke is driven positively by the shaft 12, the cam plate 44 forces the lever arm 50 to pivot slightly towards the rear under the influence of the pressure of the spring 52. Therefore, it is seen that while the roller 48 tends to stop the yoke and maintain the yoke in the home position, it does not prohibit the yoke from moving from the home position to the second position when positively driven.

Thus, it is obvious that the needle yoke detent device of the present invention serves to prevent the yoke from overrunning the home position when returning from the second position. Also the detent device serves to securely station the yoke 30 in the home position while the baler is moving through the field and not performing a tieing operation.

The terms, "upper," "lower," "forward," "rearward" etc. have been used herein merely for the convenience of the foregoing specification and in the appended claims to describe the positive detent device for the needle yoke of a hay baler and its parts as oriented in the drawings. It is to be understood, however, that these terms are in no way limiting to the invention since the positive detent device for the needle yoke of a hay baler may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Having thus described our invention, what we claim is:

1. In a hay baler of the type characterized by a longitudinal bale case, a knotter mechanism disposed adjacent said bale case, a needle yoke pivotally mounted to said bale case, a plurality of needles carried by said yoke and cooperable with said knotter mechanism for tieing portions of hay in said bale case into bales, and drive means for selectively cycling said needle yoke between a first position where said needles are disposed outside of said bale case and a second position where the needles extend through said bale case and are cooperable with said knotter mechanism, the improvement comprising a positive detent device for preventing said needle yoke from overrunning said first position, said detent device comprising: a cam plate secured to said needle yoke and having a notch formed therein, and a spring biased lever arm pivotally mounted adjacent said cam plate and having a roller rotatively mounted thereon, said roller normally engaging said cam plate, and wherein said cam plate is so disposed that said roller registers with said notch upon said needle yoke reaching said first position, thereby assuring that said yoke is stopped at said first position and does not overrun.

2. The combination, as recited in claim 1, wherein said cam plate is generally semi-circular in shape.

3. The combination, as recited in claim 1, where said lever arm is spring-biased by a coil spring having one end operatively connected to an intermediate point on said lever arm and the other end fixed at a remote point.

4. In a hay baler of the type characterized by a longitudinal bale case, a knotter mechanism disposed adjacent said bale case, a needle yoke pivotally mounted to said bale case, at least one needle carried by said needle yoke and cooperable with said knotter mechanism for tieing portions of hay in said bale case into bales, and drive means for selectively cycling said needle yoke between a first position where said needle assumes a position outside of said bale case and a second position where the needle projects through said bale case and is cooperable with said knotter mechanism, the improvement comprising a positive detent device for preventing said needle yoke from overrunning said first position, said detent device including cam means associated with said needle yoke and having a notch formed therein and a cam following mechanism normally engaged with said cam means and operative to register with said notch of said cam means when said needle yoke reaches said first position for stopping said yoke and preventing said yoke from overrunning.

5. The combination, as recited in claim 4, wherein said cam means includes a generally semi-circular cam plate having said notch formed therein; and wherein said cam following mechanism includes a roller rotatively mounted on a spring biased lever arm pivotally mounted to said bale case, said lever arm and cam plate being disposed such that said roller normally engages said cam plate and is adapted to register with said notch when said needle yoke reaches said first position, thereby holding said yoke in said first position and preventing it from overrunning.

* * * * *